US006658520B1

(12) United States Patent
Bennett

(10) Patent No.: US 6,658,520 B1
(45) Date of Patent: Dec. 2, 2003

(54) METHOD AND SYSTEM FOR KEEPING TWO INDEPENDENT BUSSES COHERENT FOLLOWING A DIRECT MEMORY ACCESS

(75) Inventor: Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 09/671,516

(22) Filed: Sep. 26, 2000

(51) Int. Cl.7 ................................................ G06F 1/00
(52) U.S. Cl. ...................... 710/312; 710/308; 710/309; 710/313
(58) Field of Search ................................. 710/305–313, 710/315, 316, 112, 110, 22, 27, 35, 61

(56) References Cited

U.S. PATENT DOCUMENTS

| 5,241,630 A | * | 8/1993 | Lattin, Jr. et al. ............ 710/306 |
| 5,249,283 A | * | 9/1993 | Boland ........................ 711/100 |
| 5,671,371 A | * | 9/1997 | Kondo et al. ................ 710/308 |
| 5,859,988 A | * | 1/1999 | Ajanovic et al. ............. 710/310 |
| 5,905,912 A | * | 5/1999 | Story et al. .................... 710/27 |
| 6,115,551 A | * | 9/2000 | Chao ............................ 710/72 |
| 6,240,481 B1 | * | 5/2001 | Suzuki ........................ 710/308 |
| 6,438,634 B1 | * | 8/2002 | Watanabe et al. ........... 710/110 |
| 6,460,108 B1 | * | 10/2002 | McCoskey et al. ......... 710/310 |
| 6,549,964 B1 | * | 4/2003 | Lai et al. ..................... 710/107 |

* cited by examiner

Primary Examiner—Paul R. Myers
Assistant Examiner—Raymond N Phan
(74) Attorney, Agent, or Firm—Jeffrey B. Huter

(57) ABSTRACT

Methods and systems for keeping two independent busses coherent that includes writing data from an Input/Output (I/O) controller to a memory. The I/O controller sends the data to the memory via a first bus connected between a first port of a memory controller and the I/O controller. A tag is sent from the I/O controller, after the data, via the first bus through the first port. The tag is received by the memory controller. Completion status of the data write is requested from the I/O controller by a processing unit. The request is sent to the I/O controller via a second bus connected between a second port of the memory controller and the I/O controller. The I/O controller waits for a tag acknowledgment from the memory controller before providing notification to the processing unit that the data write has completed. Therefore, the first bus and the second bus are coherent.

15 Claims, 3 Drawing Sheets

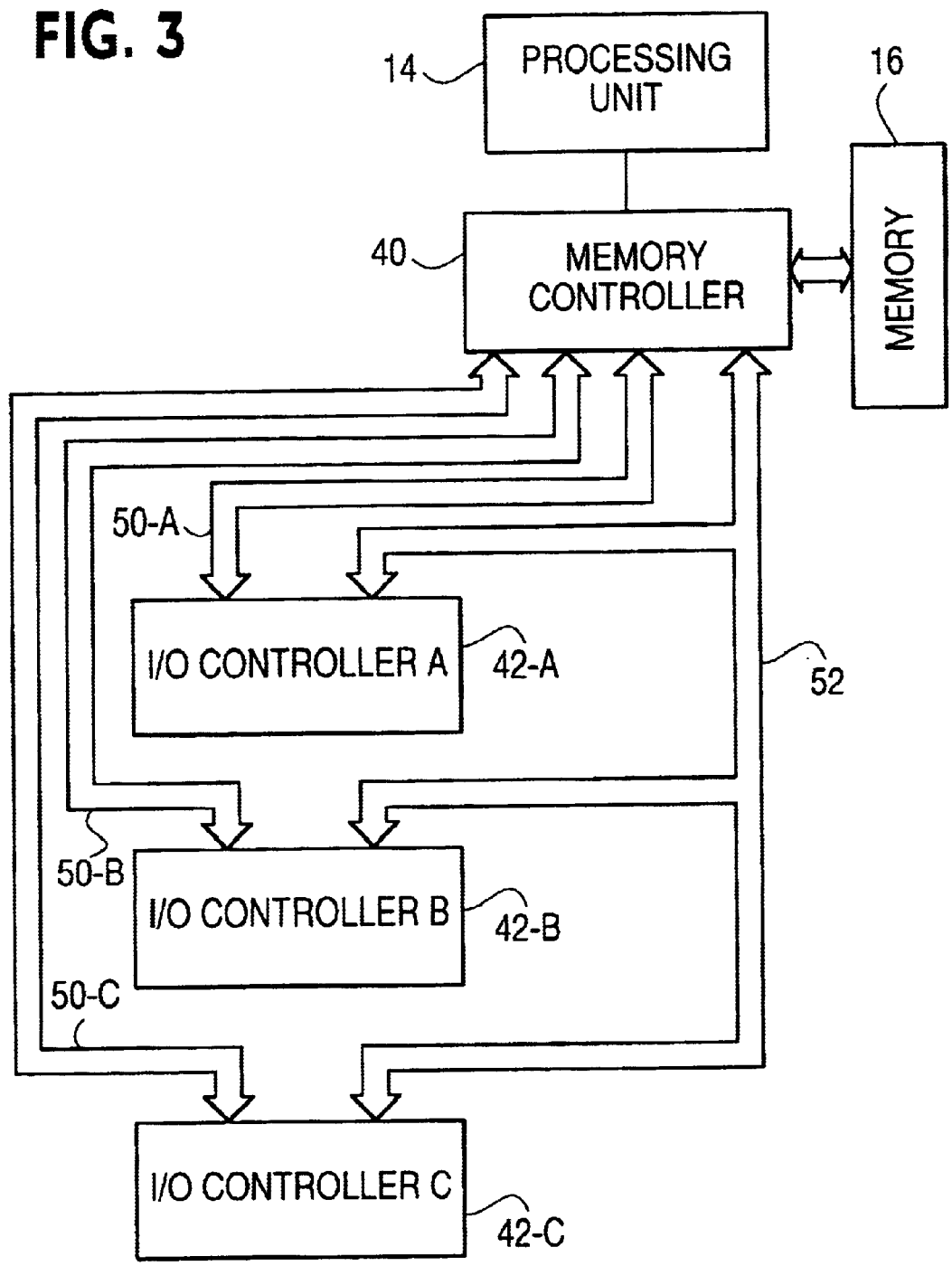

METHOD AND SYSTEM FOR KEEPING TWO INDEPENDENT BUSSES COHERENT FOLLOWING A DIRECT MEMORY ACCESS

BACKGROUND

FIELD

This invention relates to information busses, and more specifically to insuring the coherency of independent busses.

BACKGROUND

Most processing systems have, at a minimum, basic building block units of a processing unit, memory, and Input/Output (I/O) devices. Some may also include a memory controller that provides decode and control functions for accesses to and from memory. The I/O devices may be managed by an input/output (I/O) controller. An I/O controller is useful when there are multiple I/O devices of various types. Generally, only one I/O device, or other device, may access memory at a time.

FIG. 1 shows a block diagram of an example computing system. The computing system includes a memory controller 10, graphics device 12 (e.g., display), processing unit 14, memory device(s) 16, and I/O controller 18. Memory controller 10 includes a memory 22 for buffering data between graphics device 12 and memory 16, a memory 24 for buffering data between I/O controller 18 and memory 16, and a controller 11 that manages data written to and read from memory 16. Memories 22 and 24 may be first-in/first-out (FIFO) memories. I/O controller 18 includes a memory 25 that buffers data between memory controller 10 and I/O controller 18, a Peripheral Component Interconnect (PCI) interface 32 that interfaces to a PCI bus 34, and direct memory access (DMA) controllers 26, 28, 30 and 31 that control various I/O devices. Memory controller 10 and I/O controller 18 are connected by bus 20.

In the system architecture shown in FIG. 1, if software (in processing unit 14) needs to configure a DMA controller device (e.g., Universal Serial Bus (USB), Integrated Drive Electronics (IDE)) which is a legacy DMA controller, the software will send out a configuration cycle through bus 20, target the DMA controller device, and have the cycle return through bus 20 to the processing unit. However, for this to occur, the software will have to be given specific information that the DMA device resides on the port to the bus that provides the DMA operations. Typically, this may be accomplished through defining a PCI—PCI bridge such that bus numbers can be defined. However, in order for this to work, software changes may be required because current DMA controller drivers which talk to DMA devices, such as IDE, may not work behind a PCI bridge under certain operating systems (e.g., Windows 98).

Another disadvantage of the architecture according to FIG. 1 is that sending processing unit configuration cycles across one bus (e.g., bus 20) may incorporate a high overhead. The data size may be small and may interrupt high-speed data transfers from DMA controller operations, thus lowering overall system performance.

Moreover, the architecture of FIG. 1 becomes problematic as more DMA controller devices need to be added to I/O controller 18. In the architecture in FIG. 1, data and other information (e.g., configuration data from processing unit 14) passes through one bus 20. As more DMA controllers are added to the I/O controller, the bandwidth needed out of the port on I/O controller 18 driving bus 20 needs to be increased. However, bus 20 may only be capable of handling up to a certain amount of bandwidth since bus 20 may be limited by items such as: clock frequency, layout constraints on the motherboard, cost of the motherboard, arbitration issues, etc.

More buses may be added to help address this problem. However, when more ports are added (for additional buses), a new issue arises as to which bus processing unit 14 uses to read the status of each DMA controller device. In the architecture in FIG. 1, processing unit 14 always sends instructions and requests through one bus (e.g., bus 20). However, when multiple ports and buses exist, the processing unit must know which port and bus to use to access a particular DMA controller device. If a DMA controller uses one bus for access memory, and the processing unit uses a different bus for reading status of the memory access from the DMA controller, a coherency issue between the buses arises. That is, for example, the processing unit may be unsure as to whether data has been actually written to memory (and not sitting in FIFO 24) when the DMA controller send status back to processing unit 14 that the DMA operation (read) has been completed.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 3 is a block diagram of an example system where a memory controller has multiple ports to multiple buses that connect to multiple I/O controllers according to an example embodiment of the present invention.

DETAILED DESCRIPTION

Figure 1:
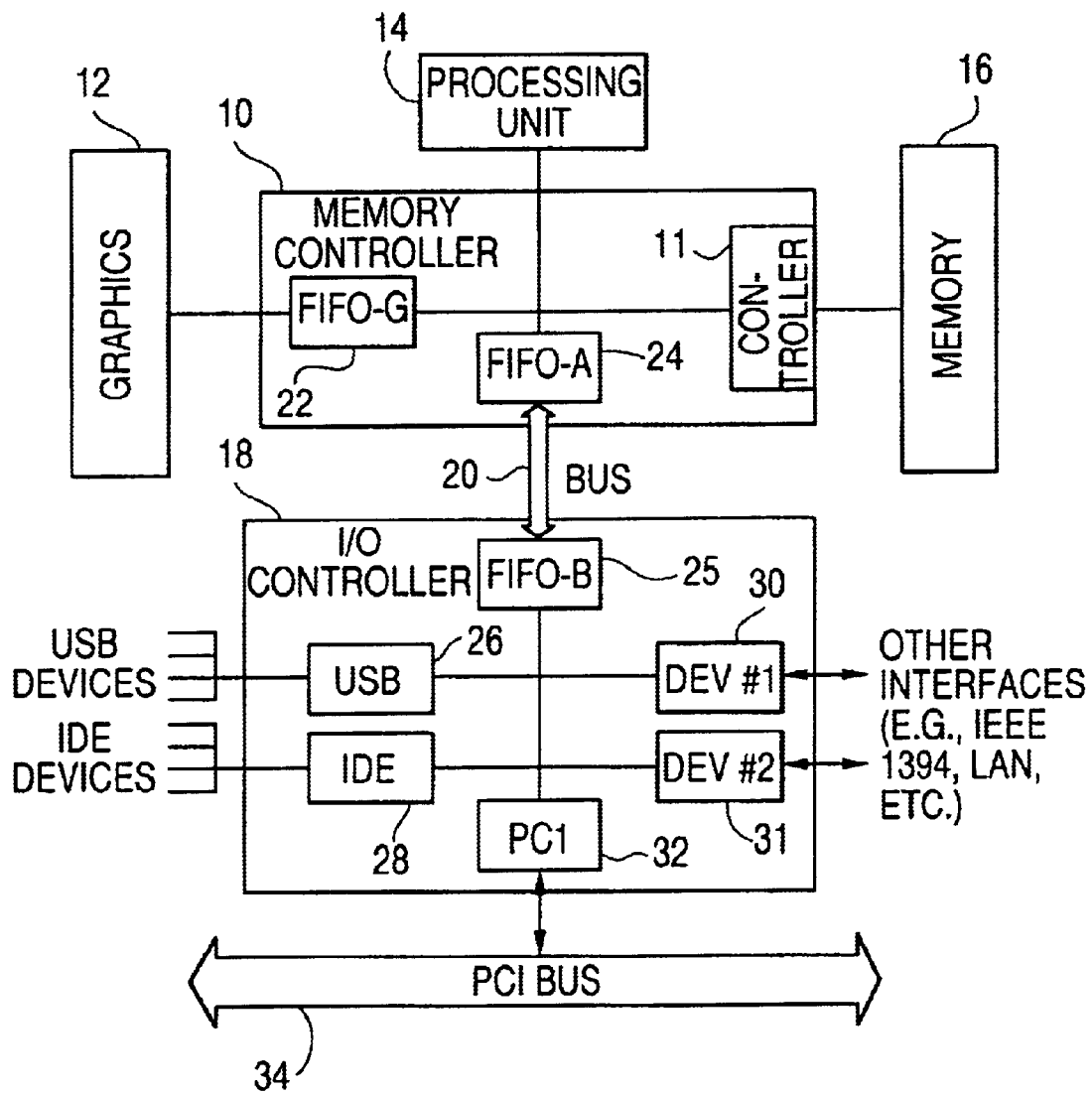
FIG. 1 is a block diagram of an example computing system.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to methods and systems for keeping independent buses coherent that enables I/O controller devices to support two or more distinct paths into main memory, yet creates no changes to existing software. Software views the two or more separate paths as if they were one. This allows legacy interfaces to be used for older DMA controller devices, and a new path to be created for high speed DMA controller devices.

According to the present invention, at least two individual buses provide connections between a memory controller and an I/O controller. One bus may provide a path between the memory controller and the I/O controller for data and instructions from a processing unit, connected to the memory controller, to be sent to DMA controllers on the I/O controller. This bus (e.g., processor data bus) may be used by the processing unit to send commands (e.g., initiate a DMA operation) to DMA controllers. The bus may also be used for reading the status of a DMA operation from the DMA controllers. A separate bus may be used by each DMA controller to perform read and write operations through the memory controller to the memory.

Further, according to the present invention, each DMA controller may transmit a fence or tag after a DMA transfer occurs via the bus used for the DMA transfer. The memory controller receives this fence or tag and upon receipt, may notify the DMA controller that the DMA operation has been completed. The tag and notification of completion are sent via the bus used for the DMA transfer (i.e., the DMA bus for that specific DMA controller). A processing unit that sends a request for status using the processor data bus to determine if the DMA operation has been completed may be notified of the completion by the DMA controller after the DMA controller receives the notification of receipt of the tag from the memory controller. The DMA controller sends a reply (i.e., completion status) to the processing unit's request via the processor data bus. Therefore, according to the present invention, coherency between the processor data bus and each DMA bus is insured.

By providing separate buses, the present invention saves software from having to be rewritten to accommodate a PCI—PCI bridge, and saves each DMA bus bandwidth from the small configuration cycle of a processor. The tag solves the problem that may occur if a DMA bus is stuck or busy, but the bus that configuration information travels through (e.g., processor data bus) is not. In this case, a processing unit may see status indicating a cycle is complete, but in reality the data has not yet been written into the memory. Therefore, the tag provides coherency between the bus that sends configuration information and the bus that carriers DMA traffic.

Figure 2:
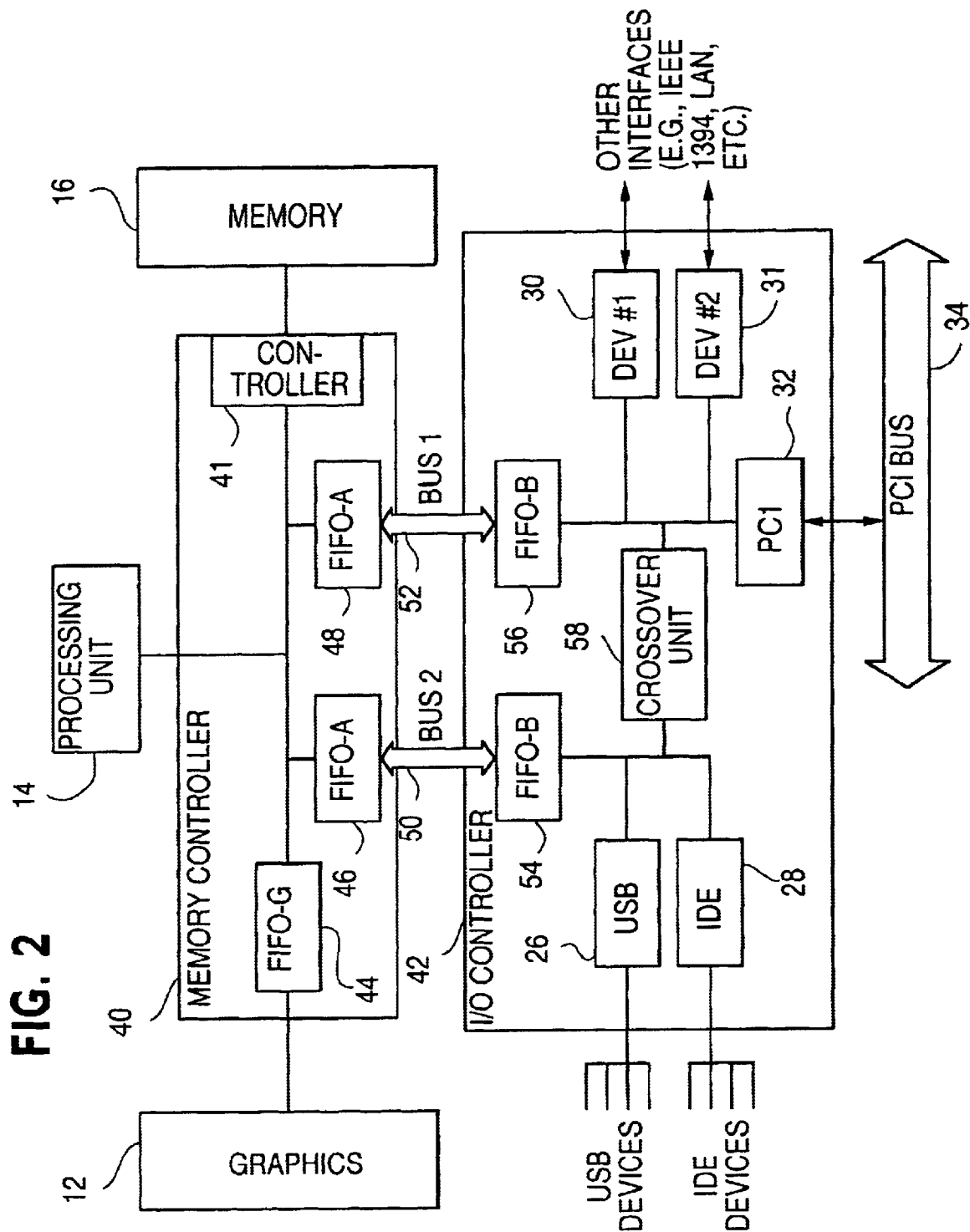
FIG. 2 is a block diagram of a system that provides coherency between two independent buses according to an example embodiment of the present invention.

FIG. 2 shows a block diagram of a system that provides coherency between two independent buses according to an example embodiment of the present invention. Memory controller 40 is operatively connected to a graphics device 12, processing unit 14, and memory 16. Further, memory controller 40 may have two or more ports that interface to buses connecting memory controller 40 to an I/O controller 42. Memory controller 40 may include a memory 44 that interfaces to graphics device 12 and memories 46, 48 for each interface port to I/O controller 42. Memory controller 40 may have a controller 41 that manages access to a memory 16.

I/O controller 42 may include one or more DMA controller devices, 26, 28 (e.g., USB, IDE), other interface devices, 30, 31, a memory 54, 56 that interfaces to each bus to memory controller 40, a cross-over unit 58, and a PCI interface 32 that interfaces I/O controller 42 to a PCI bus 34. Devices attached to PCI bus 34 may perform read/write operations with memory 16 through I/O controller 42. Crossover unit 58 transfers configuration cycles and other data between processing unit 14 and the DMA controllers. Crossover unit 58 performs intelligent routing to the appropriate DMA controller device.

Processing unit 14 may send configuration information and instructions through memory 48, bus 52, memory 56, and cross-over unit 58 to DMA control devices 26 and 28. Further, reads or requests for status from processing unit 14 may also be sent via this same path to the DMA controllers. DMA controllers 26, 28 may then respond to processing unit 14's read or request by forwarding the information through crossover unit 58, memory 56, bus 52, and memory 48, to processing unit 14.

DMA controllers 26, 28 perform DMA operations through memory 54, bus 50, memory 46, and controller 41 to and from memory 16. Memories 44, 46, 48, 54 and 56 may be first in/first out (FIFO) memories. Devices 30 and 31 may be any of a variety of devices such as, for example, a serial Advanced Technology Attachment (ATA) interface, Institute of Electrical and Electronic Engineers (IEEE) 1394 interface, 10 megabit Local Area Network (LAN) interface, etc. USB DMA controller 26 may provide interfaces to one or more USB devices to I/O controller 42. Similarly, IDE controller 28 may provide an interface to I/O controller 42 for one or more IDE devices. When either device 26, 28 performs a write operation to memory 16, the DMA controller device (26 or 28) performing the write, sends a tag or fence following the write data. Controller 41, after writing the data to memory 16, receives this tag, and provides the DMA controller device (26 or 28) with notification, e.g., tag acknowledge, that signifies that the data write to memory 16 has been completed. The notification is sent through memory 46 across bus 50 to memory 54 and then to the specific DMA controller device. Processing unit 14 may read status from DMA controller devices 26, 28 through memory 48, bus 52, memory 56 and crossover unit 58 to determine if the write operation has been completed. DMA controllers 26, 28 will wait until receipt of the notification (e.g., tag acknowledge) from controller 41 before providing status to processing unit 14 of completion of the memory write operation. The status may be provided to processing unit 14 through crossover unit 58, memory 56, bus 52 and memory 48. Therefore, in methods and systems according to the present invention, coherency is ensured between bus 50 and bus 52.

FIG. 3 shows a block diagram of an example system where a memory controller has multiple ports to multiple buses that connect to multiple I/O controllers according to an example embodiment of the present invention. Processing unit 14 is connected to memory controller 40. Memory controller 40 may be connected to I/O controllers 42-A, 42-B, and 42-C through individual buses. Bus 52 connects memory controller 40 to all three I/O controllers, 42-A, 42-B and 42-C. Bus 52 is the same as that shown in FIG. 2. Bus 52 may be used to provide data and information between processing unit 14 and DMA devices that reside on each of the I/O controllers.

Bus 50-A provides a path for DMA devices on I/O controller 42-A to memory 16 through memory controller 40. Similarly, buses 50-B and 50-C provide data information path between DMA devices on I/O controller 42-B and 42-C, respectively, through memory controller 42 to memory 16. Although only three I/O controllers are shown in FIG. 3, any number of I/O controllers connected to memory controller 40 via a separate bus for transfers to memory 16, and a common bus for information from/to processing unit 14, fall within the spirit and scope of the present invention.

The operations between the processing unit and the I/O controllers (e.g., DMA controllers), and the memory and the I/O controllers are the same as that noted previously regarding the system in FIG. 3. For example, a DMA controller device in an I/O controller that performs a write to memory 16 across either bus 50-A, 50-B or 50-C (depending on which I/O controller the DMA controller is located), sends a tag or fence following the write data across the same bus. Controller 41, after writing the data to memory 16, receives this tag, and provides the DMA controller device with notification that the tag has been received and, therefore, the data write to memory 16 has been completed. The notification is sent across either bus 50-A, 50-B or 50-C to the specific DMA controller device. Processing unit 14 may read status from the DMA controller through bus 52 to determine if the write operation has been completed. The DMA controller will wait until receipt of the notification (e.g., tag acknowledge) from controller 41 before providing status to processing unit 14 of completion of the memory write operation. The status may be provided to processing unit 14 through bus 52. Therefore, in methods and systems according to the present invention, bus 52 is coherent with each of buses 50-A, 50-B and 50-C.

The buses that transfer DMA data (e.g., buses 50, 50-A, 50-B, 50-C) and the bus that transfers configuration information (e.g., bus 52) may operate at the same speed (e.g., bandwidth) or different speeds and still be within the spirit and scope of the present invention. Further, each bus that transfers DMA data may operate at the same or different speeds. Therefore, some buses may be used for slower DMA device operations, and other buses used for high speed DMA device operations. Moreover, the various buses (DMA data and configuration information) may be of the same size (i.e., number of signal lines), or different sizes and be within the spirit and scope of the present invention. For example: the configuration bus and the DMA data buses may all be the same (e.g., 32 bits); or the configuration bus may be 10 bits and the DMA data buses may be 18 bits; or the configuration bus may be 10 bits, some DMA data buses may be 18 bits, and some DMA data buses may be 34 bits and still be within the spirit and scope of the present invention.

Moreover, the packaging of the various system components may be accomplished in any fashion and still be within the spirit and scope of the present invention. For example, the functions of the processing unit, memory controller, and I/O controller may reside on different Integrated Circuit (IC) packages, or some or all of these functions split among many IC packages. The memories may reside on one or more than one IC package. Further, the various functions may all be integrated into one die on an IC, or be split among many die on one IC package and still be within the spirit and scope of the present invention.

Methods and systems according to the present invention are advantageous since an old "legacy" interface may be used for older devices, and a new path created for high speed devices because no changes to existing software is necessary. The software views the two separate paths between a memory controller and I/O controller (DMA data and processor data) as if they were one. Therefore, no PCI—PCI bridge, no new software, and no excessive decode logic is required to accommodate legacy devices. Moreover, some DMA paths can be made faster without affecting other DMA paths.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for keeping two independent busses coherent comprising:

writing data from an Input/Output (I/O) controller to a memory, the I/O controller sending the data to the memory via a first bus connected to a first port of a memory controller and the I/O controller;

sending a tag, from the I/O controller, after the data via the first bus through the first port, the tag being received by the memory controller;

requesting completion status of the data write from the I/O controller by a processing unit, the request being sent to the I/O controller via a second bus connected to a second port of the memory controller and the I/O controller;

waiting for a tag acknowledgment, by the I/O controller, from the memory controller before providing notification to the processing unit that the data write has completed;

writing the data to the memory from one of at least one Direct Memory Access (DMA) controller at the I/O controller;

sending the data from the one of at least one DMA controller to a second memory at the I/O controller and then the writing the data to memory;

sending the data, by the I/O controller, from the second memory via the first bus to a third memory at the memory controller and then the writing the data to memory; and sending the tag acknowledge from the memory controller to the one of at least one DMA controller via the third memory, first bus, and second memory, wherein the first bus and the second bus are coherent.

2. The method according to claim 1, wherein at least one DMA controller comprises a Universal Serial Bus (USB) controller.

3. The method according to claim 1, wherein at least one DMA controller comprises an Integrated Drive Electronics (IDE) controller.

4. The method according to claim 1, further comprising sending the request for completion status to the one of at least one DMA controller from the processing unit, the request being sent via a fourth memory at the memory controller, the second bus, and a fifth memory located at the I/O controller.

5. The method according to claim 4, further comprising routing the request to an appropriate one of the at least one DMA controller by a crossover unit, the crossover unit operatively connected between each at least one DMA controller and the fifth memory.

6. A system for keeping two independent busses coherent comprising:
   at least one memory device;
   a memory controller operably connected to the at least one memory device;
   a processing unit operably connected to the memory controller;
   an Input/Output (I/O) controller operably connected to the memory controller by a first bus and a second bus, the I/O controller writing data to the at least one memory device via the first bus and the memory controller, the I/O controller sending a tag after the memory write to the memory controller via the first bus, the processing unit requesting status from the I/O controller via the memory controller and the second bus,
   a second memory at the memory controller and a third memory at the I/O controller, the data write sent from the I/O controller to the memory via the third memory, first bus, and second memory; and
   a fourth memory at the memory controller and a fifth memory at the I/O controller, the processing unit sending the status request to the I/O controller via the fourth memory, second bus, and fifth memory,
   wherein the I/O controller waits for a tag acknowledgment from the memory controller before Providing notification to the processing unit via the second bus that the data write has completed ensuring that the first bus and the second bus are coherent.

7. The system according to claim 6, further comprising at least one Direct Memory Access (DMA) controller at the I/O controller, each at least one DMA controller operatively connected to the third memory, the data write and tag sent from the I/O controller originating at one of the at least one DMA controllers.

8. The system according to claim 7, further comprising a crossover unit operatively connected between the fifth memory and each at least one DMA controller, the crossover unit routing the request to the appropriate at least one DMA controller, the appropriate at least one DMA controller waiting for the tag acknowledgment from the memory controller before providing notification to the processing unit via the crossover unit, fifth memory, second bus, and fourth memory that the data write has completed.

9. The system according to claim 7, wherein at least one DMA controller comprises a Universal Serial Bus (USB) controller.

10. The system according to claim 7, wherein at least one DMA controller comprises an Integrated Drive Electronics (IDE) controller.

11. A system for keeping two independent busses coherent comprising:
   at least one memory device;
   a memory controller operably connected to the at least one memory device;
   at least one Processing unit operably connected to the memory controller;
   at least one Input/Output (I/O) controller;
   at least one first bus, one associated at least one first bus operably connected between one at least one controller and the memo controller;
   a second bus operably connected between the memory controller and each at least one I/O controller, each at least one I/O controller writing data to the at least one memory device via the associated at least one first bus and the memory controller, each at least one I/O controller sending a tag after the memory write to the memory controller via the associated first bus, the processing unit requesting status from each at least one I/O controller that initiates the write via the memory controller and the second bus;
   a second memory at the memory controller and a third memory at the I/O controller, the data write sent from the I/O controller to the memory via the third memory, first bus, and second memory; and
   a fourth memory at the memory controller and a fifth memory at the I/O controller, the processing unit sending the status request to the I/O controller via the fourth memory, second bus, and fifth memory,
   wherein each at least one I/O controller waits for a tag acknowledgment from the memory controller before providing notification to the processing unit via the second bus that the data write has completed ensuring that each at least one first bus and the second bus are coherent.

12. The system according to claim 11, further comprising at least one Direct Memory Access (DMA) controller at the I/O controller, each at least one DMA controller operatively connected to the third memory, the data write and tag sent from the I/O controller originating at one of the at least one DMA controllers.

13. The system according to claim 12, further comprising a crossover unit operatively connected between the fifth memory and each at least one DMA controller, the crossover unit routing the request to the appropriate at least one DMA controller, the appropriate at least one DMA controller waiting for the tag acknowledgment from the memory controller before providing notification to the processing unit via the crossover unit, fifth memory, second bus, and fourth memory that the data write has completed.

14. The system according to claim 12, wherein at least one DMA controller comprises a Universal Serial Bus (USB) controller.

15. The system according to claim 12, wherein at least one DMA controller comprises an Integrated Drive Electronics (IDE) controller.

\* \* \* \* \*